US007778444B2

United States Patent
Lee et al.

(10) Patent No.: US 7,778,444 B2
(45) Date of Patent: Aug. 17, 2010

(54) METHOD AND APPARATUS FOR CORRECTING A HEAD POSE IN A VIDEO PHONE IMAGE

(75) Inventors: Mi-Suen Lee, Ossining, NY (US); Yun-Ting Lin, Ossining, NY (US); Miroslav Trajkovic, Coram, NY (US); Vasanth Philomin, Stolberg (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 599 days.

(21) Appl. No.: 10/538,204

(22) PCT Filed: Dec. 8, 2003

(86) PCT No.: PCT/IB03/05773

§ 371 (c)(1),
(2), (4) Date: Jun. 9, 2005

(87) PCT Pub. No.: WO2004/053795

PCT Pub. Date: Jun. 24, 2004

(65) Prior Publication Data

US 2006/0017804 A1   Jan. 26, 2006

Related U.S. Application Data

(60) Provisional application No. 60/432,539, filed on Dec. 11, 2002.

(51) Int. Cl.
*G06K 9/00* (2006.01)
*G06K 9/36* (2006.01)

(52) U.S. Cl. .................. 382/103; 382/118; 382/289; 382/291; 382/293

(58) Field of Classification Search ............... 382/103, 382/118, 289, 291, 293; 348/14.01, 14.1
See application file for complete search history.

(56) References Cited

U.S. PATENT DOCUMENTS

| 6,707,933 | B1 * | 3/2004 | Mariani et al. | ............... 382/118 |
| 6,806,898 | B1 * | 10/2004 | Toyama et al. | ........... 348/14.16 |
| 6,829,384 | B2 * | 12/2004 | Schneiderman et al. | ..... 382/154 |
| 2002/0159627 | A1 * | 10/2002 | Schneiderman et al. | ..... 382/154 |
| 2003/0064685 | A1 * | 4/2003 | Kim | ............................ 455/90 |
| 2003/0222846 | A1 * | 12/2003 | Nguyen | ...................... 345/156 |

FOREIGN PATENT DOCUMENTS

WO   WO 99/57900   * 11/1999

* cited by examiner

*Primary Examiner*—Brian Q Le

(57) ABSTRACT

An image processing system (250) and method (300) are disclosed for correcting a head pose in a video phone image, so that a frontal view is presented on a display. A disclosed head pose corrector (250) estimates the orientation of a head pose and adjusts the orientation of the head pose, if necessary, to present a frontal view. The orientation of the head pose is adjusted by generating a three dimensional model of the face surface and adjusting the orientation of the three dimensional face model to provide the desired frontal view. The head pose corrector (250) may be included in a video phone (100) to correct the head pose of transmitted or received images (or both) or may be included in a server on a network to automatically adjust the head shots of one or more participants to a video phone communication.

20 Claims, 2 Drawing Sheets

METHOD AND APPARATUS FOR CORRECTING A HEAD POSE IN A VIDEO PHONE IMAGE

CROSS REFERENCE TO RELATED APPLICATION

This application claims the benefit of U.S. provisional application Ser. No. 60/432,539 filed Dec. 11, 2002, which is incorporated herein by reference.

The present invention relates to video phone systems, and more particularly, to a method and apparatus for correcting a head pose in a video phone image.

The consumer marketplace offers a wide variety of communications and media options. For example, various video phones are known that enable audio and video communications between users connected over a telephone line. A video phone system typically includes a microphone and speaker for enabling bidirectional audio communications and a camera and display for enabling bidirectional video communications.

The technology for video phone applications has advanced to a point where video phone options are now being offered by many wireless telephone service providers. Wireless video phones thus enable audio and video communications between users connected over a wireless link. One common problem with video phone communications that is particularly problematic with mobile users is that one or both participants to a video phone call may not be able to present a frontal face image to the camera at all time. For example, if a user is walking and looking at the sidewalk while holding the camera portion of the video phone in his or her hand, then the remote participant will typically see a "chin view" of the user's face. Similarly, if a user is sitting at a desk and turning his or her head to look at a computer display, while the camera portion of the video phone is positioned on the user's desk, then the remote participant may see a "profile view" of the user's face.

A need therefore exists for a method and apparatus that correct a head pose in a video phone image, so that the remote participant will see a proper frontal view of the other participant. A further need exists for an improved technique for estimating and correcting a head pose that is suitable for implementation on a wireless phone.

Generally, an image processing system and method are disclosed for correcting a head pose in a video phone image, so that a frontal view is presented on a display. A disclosed head pose corrector estimates the orientation of a head pose and adjusts the orientation of the head pose, if necessary, to present a frontal view. The orientation of the head pose is adjusted by generating a three dimensional model of the face surface and adjusting the orientation of the three dimensional face model to provide the desired frontal view.

The disclosed head pose corrector may be included in a video phone of a user, to correct the head pose of transmitted or received images (or both) or may be included in a server on a network to automatically adjust the head shots of one or more participants to a video phone communication. The computational requirements of the head pose corrector are suitable for implementation on a wireless video phone.

A more complete understanding of the present invention, as well as further features and advantages of the present invention, will be obtained by reference to the following detailed description and drawings.

Figure 1:
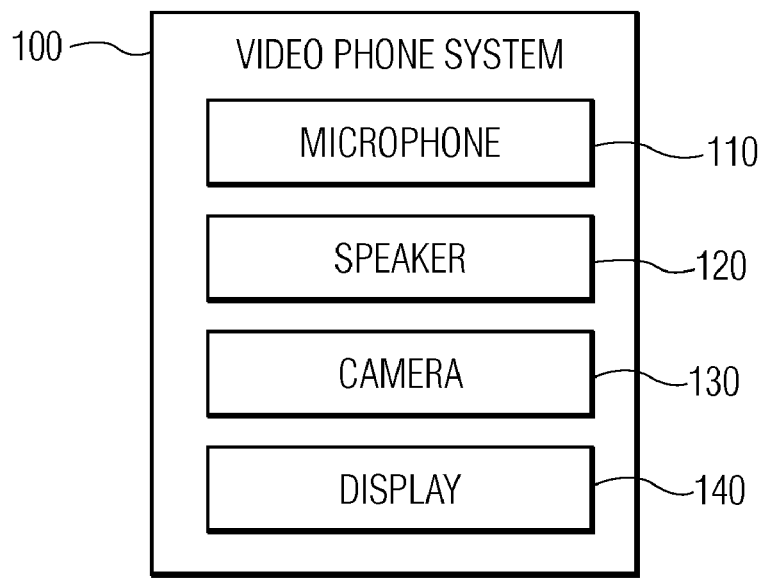
FIG. 1 illustrates a conventional video phone system.

FIG. 1 illustrates a conventional video phone system 100. As shown in FIG. 1, the exemplary conventional video phone system 100 includes a microphone 110, a speaker 120, a camera 130 and a display 140 for enabling audio and video communications between two or more users. The conventional video phone system 100 may be embodied as any available video phone system, such as those commercially available from Sony Ericsson Mobile Communications. It is noted that the microphone 110, speaker 120, camera 130 and display 140 may be integrated in a single unit, such as a desktop phone, or may be embodied as two or more modular units, as would be apparent to a person of ordinary skill in the art. For example, the camera 130 and display 140 may be embodied as modular attachments to a conventional telephone having the microphone 110 and speaker 120. In one particular implementation, the conventional video phone system 100 may be embodied as the T68i video phone system with a camera attachment, commercially available from Sony Ericsson Mobile Communications.

Figure 2:
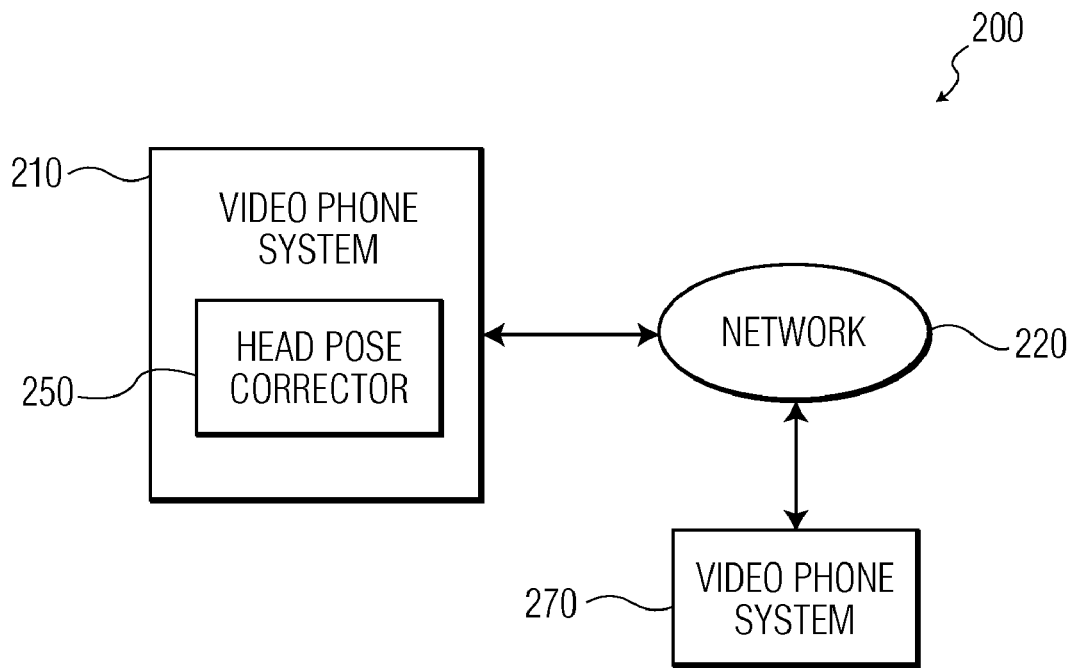
FIG. 2 illustrates a network environment in which the present invention can operate.

FIG. 2 illustrates a network environment 200 in which the present invention can operate. As shown in FIG. 2, a first video phone system 210 incorporating features of the present invention communicates over a network 220 with one or more additional video phone systems, such as the video phone system 270. The network 220 may be embodied as one or more wired or wireless networks, or a combination of the foregoing. The first video phone system 210 may be embodied as a conventional video phone system, such as the video phone system 100 shown in FIG. 1, as modified herein to provide the features and functions of the present invention. The additional video phone systems 270 may be a conventional video phone system or a video phone system incorporating features of the present invention.

According to one aspect of the present invention, the video phone system 210 includes a head pose corrector 250 that employs a head pose estimation and correction process 300, discussed further below in conjunction with FIG. 3. The head pose corrector 250 may be integrated with a conventional video phone system 100 in a single unit, such as a desktop phone, or may be embodied as a modular attachment to a conventional video phone system 100, as would be apparent to a person of ordinary skill in the art.

While the head pose corrector 250 is implemented in the exemplary embodiment in the video phone 210 of the first user, to process images of the local user that are being transmitted for display to the second user, the head pose corrector 250 could alternatively process images of the remote user(s) that are received from one or more additional video phone systems 270 for presentation to the user of the first video phone 210. In a further variation, the head pose corrector 250 can be implemented in a server on the network 220 by a service provider to automatically adjust the head shots of all participants to a video phone communication in accordance with the teachings of the present invention.

Figure 3:
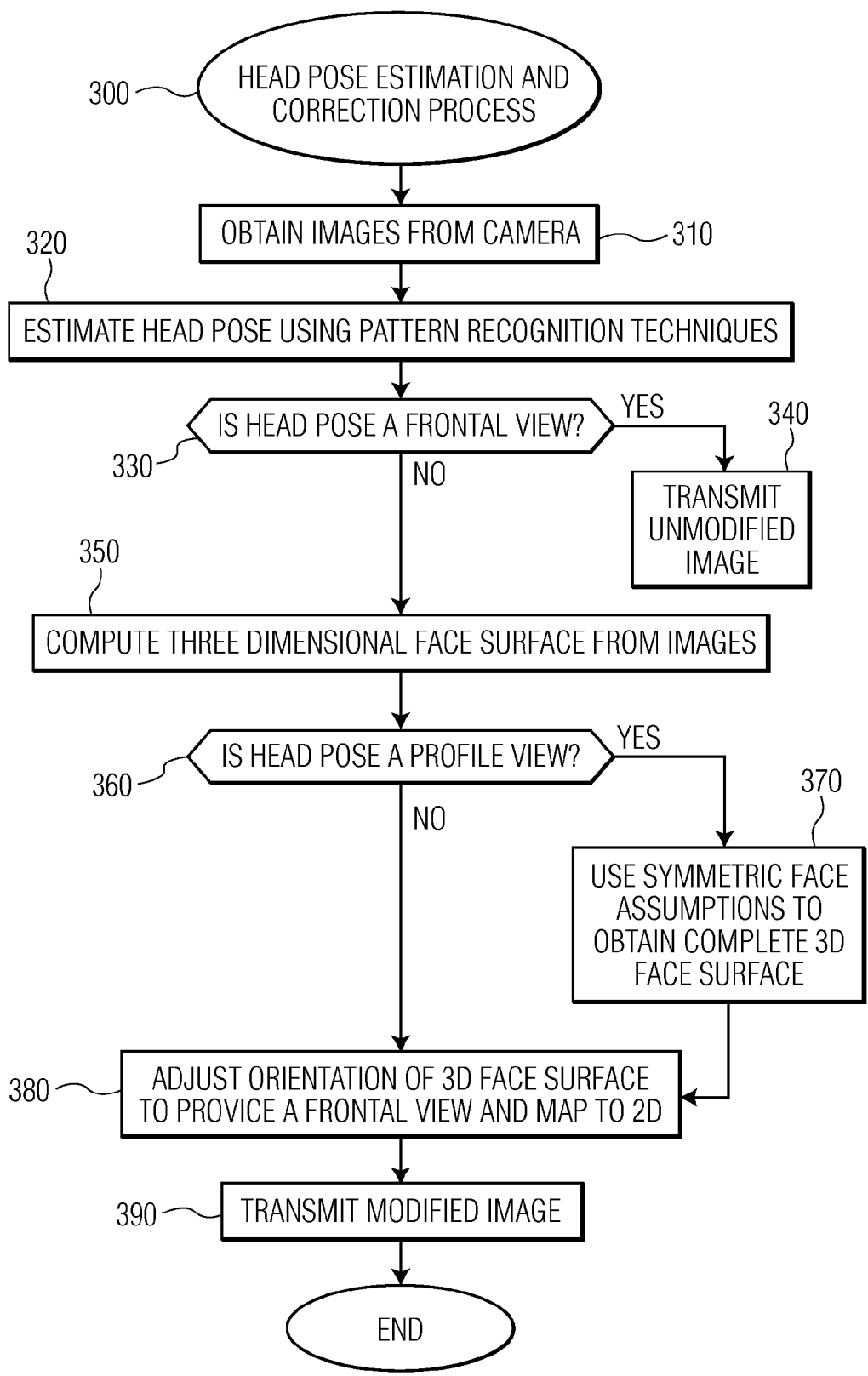
FIG. 3 is a flow chart describing an exemplary implementation of the image correction process of FIG. 2.

FIG. 3 is a flow chart describing an exemplary implementation of the head pose estimation and correction process 300. Generally, the head pose estimation and correction process 300 ensures that a video phone image is a proper frontal view of a user. The computational requirements of the head pose estimation and correction process 300 are suitable for implementation on a wireless phone.

As shown in FIG. 3, the head pose estimation and correction process 300 initially obtains a sequence of images from the camera of the video phone system 210 during step 310. Thereafter, the head pose estimation and correction process 300 estimates the head pose during step 320 using pattern recognition techniques, such as the classification techniques described, for example, in Y. Li, S. Gong, and H. Liddell, "Support Vector Regression and Classification Based Multi-View Face Detection and Recognition," IEEE Conf. on Automatic Face and Gesture Recognition 2000, incorporated by reference herein. Generally, the classification technique employed during step 320 will provide a characterization of the head pose, such as frontal view, chin view or profile view. In one variation, the classification techniques also provide the extent to which a chin view or profile view deviates from a true frontal view. While many methods for estimating a head pose are computationally intensive, and susceptible to noise, the present invention recognizes that a practical solution is obtained in a video phone environment where in most cases a facial image is expected.

A test is then performed during step 330 to determine if the head pose is a frontal view. If it is determined during step 330 that the head pose is a frontal view, then the head pose correction techniques of the present invention are not needed and the unmodified image is transmitted during step 340.

If, however, it is determined during step 330 that the head pose is not a frontal view, then a three dimensional model is computed of the face surface from a sequence of facial images during step 350 using computer vision techniques, such as "structure from motion" techniques. For a detailed discussion of suitable techniques for computing a three dimensional model of the face surface from a sequence of facial images, see, for example, M. Brand, "Morphable 3D Models from Video," Computer Vision & Pattern Recognition (CVPR) (2001) or M. Brand, "Flexible Flow for 3D Nonrigid Tracking and Shape Recovery," Computer Vision & Pattern Recognition CVPR (2001), each incorporated by reference herein. While many methods for estimating a general surface are computationally intensive, and susceptible to noise, the present invention recognizes that a practical solution is obtained in a video phone environment where in most cases a facial surface is expected.

A test is then performed during step 360 to determine if the head pose is a profile view. If it is determined during step 360 that the head pose is a profile view, then symmetric facial assumptions are employed during step 370 to estimate the remaining portion of the head that is not present in the profile view. Program control then proceeds to step 380.

If it is determined during step 370 that the head pose is not a profile view then the view must be a chin view or a forehead view and program control proceeds directly to step 380. During step 380, the orientation of three dimensional face surface is adjusted to provide a frontal view.

Specifically, the origin of the three dimensional face surface is moved from where the input images are taken to a point in front of the nose point of the face surface. For example, chin view images are taken from a point below the desire origin and therefore origin correction is achieved by moving the three dimensional coordinates upwards. Similarly, forehead view images are corrected by moving the three dimensional coordinates downward. Profile view images are corrected by rotating the three dimensional coordinates of the face surface by 90 degrees above the vertical axis of the surface. A frontal view can then be obtained by applying a standard perspective projection.

The modified image is then transmitted to the remote user during step 390. Thereafter, program control terminates.

It is to be understood that the embodiments and variations shown and described herein are merely illustrative of the principles of this invention and that various modifications may be implemented by those skilled in the art without departing from the scope and spirit of the invention.

The invention claimed is:

1. A method for processing during a video phone communication between a plurality of participants using handheld video phone systems an image taken by a camera of a first handheld video phone system for playback on a display of at least one other handheld video phone system connected in a network, each handheld video phone system having an image processor, the method comprising acts of:

providing the image containing at least a portion of a head of a user of the video phone system to an image processor selected from one of the first and at least one other handheld video phone systems and a server connected in the network;

estimating an orientation of said head in said image using a pattern recognition technique, said pattern recognition technique comprises a classification technique;

if the orientation of said head is estimated to not be frontal, computing a three dimensional model of a face surface of said user using a computer vision technique based on the result of the classification technique; and adjusting an orientation of said three dimensional face surface model to provide a frontal view, wherein the camera and the display of the handheld video phone system are integrated into a single unit and wherein the camera is oriented in the single unit to capture the portion of the head of the user during use of the handheld video phone system.

2. The method of claim 1, wherein said computing act further comprises an act of using a symmetric face assumption to obtain a complete three dimensional face surface model for a profile view.

3. The method of claim 1, wherein said computing act further comprises an act of employing a structure from motion technique to obtain said three dimensional face surface model.

4. The method of claim 1, wherein said computing act generates a morphable three dimensional model.

5. The method of claim 1, further comprising an act of mapping said three dimensional face surface model having an adjusted orientation to a two dimensional space.

6. The method of claim 1, further comprising an act of transmitting said adjusted image to a remote user.

7. The method of claim 1, further comprising an act of presenting said adjusted image to a local user.

8. An image processor for processing during a video phone communication between a plurality of participants using handheld video phone systems an image taken by a camera of a first handheld video phone system for playback on a display of at least one other handheld video phone system connected in a network, the image processor comprising:

a memory for storing an image containing at least a portion of a head of a user of the handheld video phone system; and a head pose corrector provided on one of the first and at least one other handheld video phone systems and a server connected in on the network that estimates an orientation of said head in said image using a pattern recognition technique, said pattern recognition technique comprises a classification technique if the orientation of said head is estimated to not be frontal;

computes a three dimensional model of a face surface of said user using a computer vision technique based on the result of the classification technique; and adjusts an orientation of said three dimensional face surface model to provide a frontal view, wherein the camera and the display of the handheld video phone system are integrated into a single unit and wherein the camera is oriented in the single unit to capture the portion of the head of the user during use of the handheld video phone system.

9. The image processor of claim 8, wherein said head pose corrector is further configured to use a symmetric face assumption to obtain a complete three dimensional face surface model for a profile view.

10. The image processor of claim 8, wherein said head pose corrector is further configured to employ a structure from motion technique to obtain said three dimensional face surface model.

11. The image processor of claim 8, wherein said three dimensional face surface model is a morphable three dimensional model.

12. The image processor of claim 8, wherein said head pose corrector is further configured to map said three dimensional face surface model having an adjusted orientation to a two dimensional modified image.

13. The image processor of claim 12, wherein said two dimensional modified image is transmitted to a remote user.

14. The image processor of claim 12, wherein said two dimensional modified image is presented to a local user.

15. A video phone system having an image processor for processing during a video phone communication between a plurality of participants using handheld video phone systems an image taken by a camera of a first handheld video phone system for playback on a display of at least one other handheld video phone system connected in a network, the system comprising:

a memory for storing an image containing at least a portion of a head of the video phone system user; and a head pose corrector provided on one of the first and at least one other handheld video phone systems and a server connected in on the network that estimates an orientation of said head in said image using a pattern recognition technique, said pattern recognition technique comprises a classification technique if the orientation of said head is estimated to not be frontal computes a three dimensional model of a face surface of said video phone system user using a computer vision technique based on the result of the classification technique; and adjusts an orientation of said three dimensional face surface model to provide a frontal view, wherein the camera and the display of the handheld video phone system are integrated into a single unit and wherein the camera is oriented in the single unit to capture the portion of the head of the user during use of the handheld video phone system.

16. The video phone system of claim 15, wherein said head pose corrector is further configured to use a symmetric face assumption to obtain a complete three dimensional face surface model for a profile view.

17. The video phone system of claim 15, wherein said head pose corrector is further configured to employ a structure from motion technique to obtain said three dimensional face surface model.

18. The video phone system of claim 15, wherein said head pose corrector is further configured to map said three dimensional face surface model having an adjusted orientation to a two dimensional modified image.

19. The video phone system of claim 18, wherein said two dimensional modified image is transmitted to a remote user.

20. The video phone system of claim 18, wherein said two dimensional modified image is presented to a local user.

* * * * *